US008869133B2

(12) United States Patent
Alls et al.

(10) Patent No.: US 8,869,133 B2
(45) Date of Patent: Oct. 21, 2014

(54) METHOD AND SYSTEM FOR USE IN FACILITATING PATCH CHANGE MANAGEMENT OF INDUSTRIAL CONTROL SYSTEMS

(71) Applicant: General Electric Corporation, Schenectady, NY (US)

(72) Inventors: Lindy Lawrence Alls, Longmont, CO (US); Susan Ruth Peterson, Fort Collins, CO (US); Eric Fiedler Taylor, Carson City, NV (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 13/669,770

(22) Filed: Nov. 6, 2012

(65) Prior Publication Data
US 2014/0130033 A1 May 8, 2014

(51) Int. Cl.
G06F 9/44 (2006.01)

(52) U.S. Cl.
USPC ............................ 717/172; 717/173; 717/174

(58) Field of Classification Search
USPC ................................... 717/172–176; 709/203
See application file for complete search history.

(56) References Cited

U.S. PATENT DOCUMENTS

| 6,606,744 | B1 * | 8/2003 | Mikurak ........................ 717/174 |
| 6,966,002 | B1 * | 11/2005 | Torrubia-Saez ................. 726/29 |
| 7,000,230 | B1 * | 2/2006 | Murray et al. ................. 717/172 |
| 7,478,383 | B2 * | 1/2009 | Shahindoust et al. ........ 717/172 |
| 7,546,594 | B2 * | 6/2009 | McGuire et al. .............. 717/168 |
| 7,689,984 | B2 | 3/2010 | Riley |
| 7,823,147 | B2 * | 10/2010 | Moshir et al. .................. 717/173 |
| 7,873,959 | B2 * | 1/2011 | Zhu et al. ........................ 717/172 |
| 8,006,241 | B2 * | 8/2011 | Dias ............................... 717/174 |
| 8,024,399 | B2 * | 9/2011 | Reisman ....................... 709/203 |
| 8,245,216 | B2 * | 8/2012 | Felts ............................... 717/169 |
| 8,271,975 | B2 * | 9/2012 | DeHaan ......................... 717/177 |
| 8,296,756 | B1 * | 10/2012 | Feeser et al. .................. 717/173 |
| 8,365,164 | B1 * | 1/2013 | Morgenstern ................. 717/175 |
| 8,495,615 | B2 * | 7/2013 | Alberti et al. ................. 717/172 |
| 8,533,703 | B2 * | 9/2013 | Cheng et al. .................. 717/172 |
| 8,595,831 | B2 * | 11/2013 | Skare .............................. 726/22 |
| 2008/0276295 | A1 | 11/2008 | Nair |
| 2011/0225575 | A1 | 9/2011 | Ningombam et al. |

OTHER PUBLICATIONS

Vojnovic et al, "On the Effectiveness of Automatic Patching", ACM, pp. 41-50, 2005.*

(Continued)

Primary Examiner — Anil Khatri
(74) Attorney, Agent, or Firm — Fletcher Yoder, P.C.

(57) ABSTRACT

An offline patch change management system for an industrial facility includes at least one reader device configured to read patch update information stored on computer-readable storage media inserted therein. The industrial facility includes an industrial control system that includes at least cyber asset. The system also includes a memory device coupled to the reader device. The memory device is configured to store the patch update information. The system further includes a processor coupled to the memory device. The processor is programmed to scan the at least one cyber asset. The processor is also programmed to generate a scan report including a patch status for at least one patch not operatively resident on the at least one cyber asset. The scan report includes a deployment temporal period value for deployment of the patch.

18 Claims, 5 Drawing Sheets

(56) References Cited

OTHER PUBLICATIONS

Pasala et al, "An Approach to Select Regression Tests to Validate .NET Applications upon Deployment of Components Upgrades", ACM, pp. 1-8, 2008.*

Kreutz et al, "Towards Secure and Dependable Software-Defined Networks", ACM, pp. 55-60, 2013.*

Li et al, "An Efficient Code Update Scheme for DSP Applications in Mobile Embedded Systems", ACM, 105-114, 2010.*

Recommended Practice for Patch Management of Control Systems, 2008, 29 pages, Department of Homeland Security Security Division Control Systems Security Program.

* cited by examiner

Patch Applicability Report

| Status | Patch Number | Bulletin ID | Bulletin Title | US-CERT Criticality Rating | Restart Requirement | Estimated Patch Install Time |
|---|---|---|---|---|---|---|
| Missing | KB2510690 Q2510690 | | Office 2010 Service Pack 1 | High | May require restart | 20 minutes |
| Missing | KB2553070 Q2553070 | MS11-072 | Vulnerabilities in Microsoft Excel Could Allow Remote Code Execution | High | May require restart | 5 minutes |
| Missing | KB2553091 Q2553091 | MS11-072 | Vulnerabilities in Microsoft Excel Could Allow Remote Code Execution | High | May require restart | 2 minutes |
| Missing | KB2553096 Q2553096 | MS11-072 | Vulnerabilities in Microsoft Excel Could Allow Remote Code Execution | High | May require restart | 2 minutes |
| Missing | KB2584066 Q2584066 | MS11-073 | Vulnerabilities in Microsoft Excel Could Allow Remote | High | May require restart | 2 minutes |

FIG. 5

METHOD AND SYSTEM FOR USE IN FACILITATING PATCH CHANGE MANAGEMENT OF INDUSTRIAL CONTROL SYSTEMS

BACKGROUND OF THE INVENTION

The present application relates generally to cyber asset management of industrial control system software, and more particularly, to a method and system for use in facilitating patch and update management of industrial control systems.

Many known industrial control systems are installed within industrial facilities that include critical infrastructure. Such known industrial control systems typically include supervisory control and data acquisition (SCADA) systems and process control systems that control, monitor, and manage the execution of the functions associated with the infrastructure based on established parameters and the real-time information they receive. At least some of such industrial facilities include electric power generation and transmission facilities, transportation systems, dam and water systems, communication systems, chemical and petroleum systems, and other critical facilities that are not intended to tolerate sudden interruptions in service.

At least some of such known industrial control systems are deployed within large networks extending through large geographic areas, including worldwide deployments. Therefore, many known industrial control systems are deployed using mature and universal communication protocols such as the Transmission Control Protocol/Internet Protocol (TCP/IP) to easily and economically create large integrated systems of previously isolated industrial control systems. However, with the increased size, complexity, and interconnectivity, some industrial control systems have increased security vulnerabilities. For example, with increased network communications, a single industrial control system component compromise could lead to a much larger cascading failure in adjacent networked systems by allowing unintended, exploitable access. Tracing and isolating the root cause of a system failure in networked systems becomes much more difficult and with potentially far-reaching consequences.

Moreover, many known industrial control systems require routine or periodic updates, sometimes referred to as patches, to resolve security vulnerabilities and functional issues. Therefore, many asset owners of such industrial control systems have instituted a patch management system for patch deployment that lies somewhere in the spectrum between fully manual to fully automated, and most include some combination therebetween. For example, at least some patch management systems require at least one of manual inventories of previously implemented patches, manual evaluations of currently available patches, and manual trial-and-error patch implementations on test platforms, and such manual efforts are time and resource intensive. Also, some patches may require the associated industrial control system be taken off line, thereby requiring at least a portion of the system be removed from service for an undetermined period of time with the associated disruption of the facility. In addition, some patches may require a full system restart once deployed. Therefore, deployment of some patches may be delayed due to such uncertainties with respect to system and facility impact, thereby rendering unscheduled patching with questionable impact improbable for risk-adverse facilities. Moreover, some known large industrial customers may require patching activities at many geographically dispersed sites, with a large number of units at each site, making a quick response difficult. Furthermore, many patch management systems for industrial control systems primarily, or exclusively, address process functionality issues within the original code rather than enhance security.

BRIEF DESCRIPTION OF THE INVENTION

In one embodiment, an offline patch change management system for an industrial facility is provided. The industrial facility includes at least one industrial control system that includes at least one cyber asset. The offline patch change management system includes at least one reader device configured to read patch update information stored on computer-readable storage media inserted therein. The offline patch change management system also includes a memory device coupled to the at least one reader device. The memory device is configured to store the patch update information. The offline patch change management system further includes a processor coupled to the memory device. The processor is programmed to scan the at least one cyber asset. The processor is also programmed to generate a scan report including a patch status for at least one patch not operatively resident on at least one of the at least one cyber asset. The scan report includes a deployment temporal period value for deployment of the at least one patch.

In another embodiment, an offline method for patch change management of cyber assets is provided. The method includes providing at least one computing device and coupling at least one reader device to the at least one computing device. The method also includes reading patch update information stored on computer-readable storage media using the at least one reader device. The method further includes scanning at least portions of an industrial control system that includes at least one cyber asset. The method also includes generating a scan report including a patch status for at least one patch not operatively resident on the at least one cyber asset. The scan report includes a deployment temporal period value for deployment of the at least one patch.

In yet another embodiment, an industrial facility is provided. The industrial facility includes at least one industrial control system including at least one cyber asset and an offline patch change management system. The offline patch change management system includes at least one reader device configured to read patch update information stored on computer-readable storage media inserted therein. The offline patch change management system also includes a memory device coupled to the at least one reader device. The memory device is configured to store the patch update information. The offline patch change management system further includes a processor coupled to the memory device. The processor is programmed to scan the at least one cyber asset. The processor is also programmed to generate a scan report including a patch status for at least one patch not operatively resident on the at least one cyber asset. The scan report includes a deployment temporal period value for deployment of the at least one patch.

BRIEF DESCRIPTION OF THE DRAWINGS

FIG. 5 is an exemplary patch applicability report generated by the patch change management system shown in FIG. 3 using the method shown in FIG. 4.

DETAILED DESCRIPTION OF THE INVENTION

Figure 1:
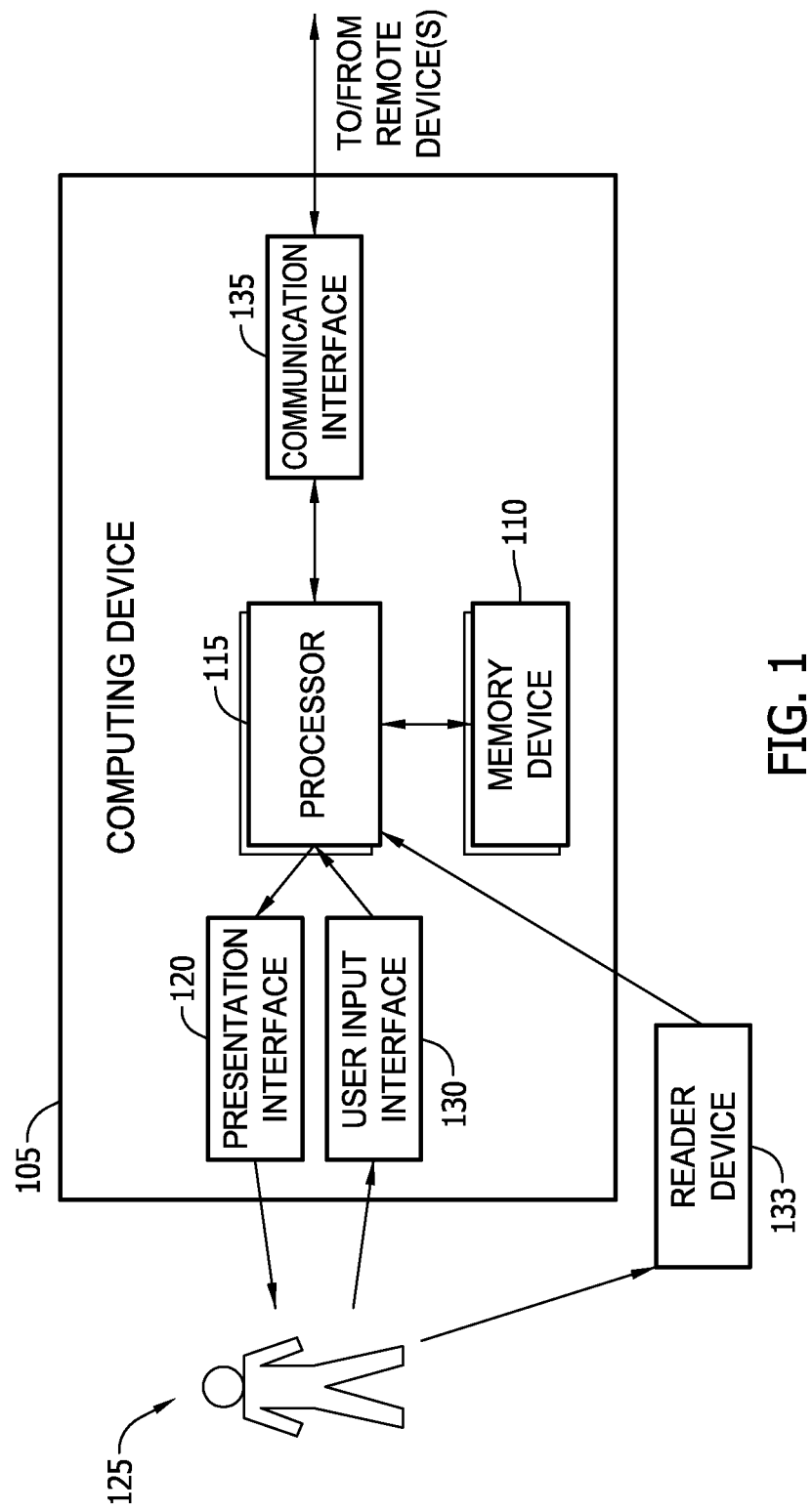
FIG. 1 is a block diagram of an exemplary computing device.

FIG. 1 is a block diagram of an exemplary computing device 105 that may be used to perform interface activities with any industrial control system (not shown in FIG. 1). Computing device 105 includes a memory device 110 and a processor 115 operatively coupled to memory device 110 for executing instructions. Processor 115 may include one or more processing units (e.g., in a multi-core configuration). In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Further, as used herein, the terms "software" and "firmware" are interchangeable, and include any computer program stored in memory for execution by personal computers, workstations, clients and servers.

Moreover, as used herein, the term "non-transitory computer-readable media" includes all tangible, computer-readable media, such as a firmware, floppy disk, CD-ROMs, DVDs and another digital source such as a network or the Internet, as well as yet to be developed digital means, with the sole exception being a transitory, propagating signal.

Memory device 110 may be configured to store operational measurements including, without limitation, real-time and historical process values, and/or any other type data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate interface activities with any industrial control system (discussed further below).

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In some embodiments, computing device 105 includes a presentation interface 120 coupled to processor 115. Presentation interface 120 presents information, such as a user interface and/or an alarm, to a user 125. In one embodiment, presentation interface 120 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 includes an audio output device (not shown) (e.g., an audio adapter and/or a speaker) and/or a printer (not shown). In some embodiments, presentation interface 120 presents an alarm associated with the electrical switchgear being monitored, such as by using a human machine interface (HMI) (not shown in FIG. 1).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 120 and user input interface 130.

Also, in the exemplary embodiment, computing device 105 includes a reader device 133 coupled to processor 115. Reader device 133 may include, without limitation, a DVD reader and a CD reader. Also, reader device 133 may be integrated within computing device 105 or may be a stand-alone external device.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
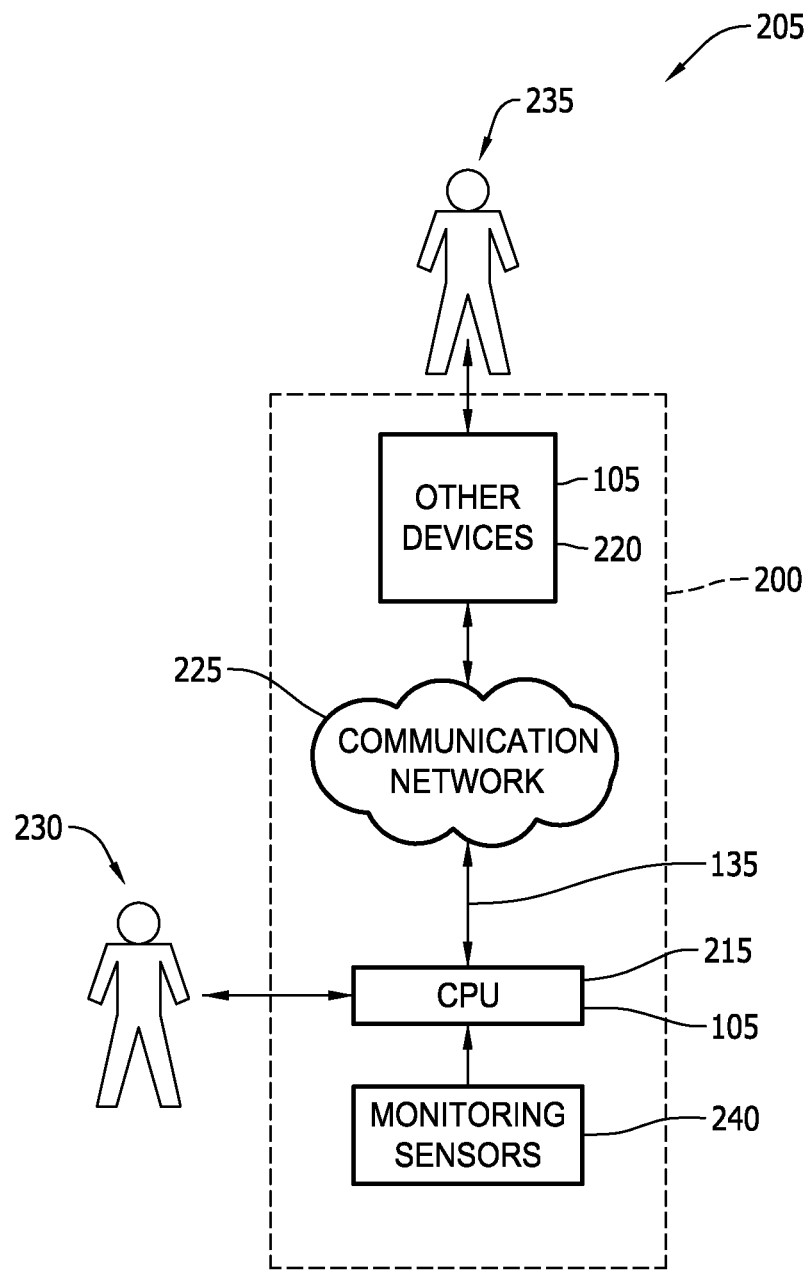
FIG. 2 is block diagram of a portion of an exemplary industrial control system.

FIG. 2 is block diagram of a portion of an exemplary industrial control system 200 that may be used to monitor at least a portion of an industrial facility 205. Industrial facility 205 is any facility that enables operation of industrial control system 200 as described herein, including, without limitation, chemical and petroleum processing plants, electric power generation plants (nuclear, fossil, gas turbines, hydro, renewables), gasification plants, integrated gasification combined cycle plants, electric power transmission and distribution systems, and natural gas transmission systems.

Industrial control system 200 includes at least one central processing unit (CPU) 215 that may be coupled to other devices 220 via a communication network 225. CPU 215 may be, without limitation, a facility-level centralized controller, a switchgear-level centralized controller, one of a plurality of distributed controllers, and a portable controller. Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, CPU 215 may perform all of the operations below.

Referring to FIGS. 1 and 2, CPU 215 may be computing device 105. In the exemplary embodiment, CPU 215 is coupled to network 225 via communication interface 135. Controller 215 is integrated with other devices 220. As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 2), and these terms are used interchangeably herein. Also, as used herein, the term "cyber assets" refers to information technology devices, such as, without limitation, computing device 105, controller 215, communications network 225, and monitoring sensors 240.

CPU 215 interacts with a first operator 230 (e.g., via user input interface 130 and/or presentation interface 120). In one embodiment, CPU 215 presents information about industrial facility 205, such as alarms, to operator 230. Other devices 220 interact with a second operator 235 (e.g., via user input interface 130 and/or presentation interface 120). For example, other devices 220 present alarms and/or other operational information to second operator 235. As used herein, the term "operator" includes any person in any capacity associated with operating and maintaining industrial facility 205, including, without limitation, shift operations personnel, maintenance technicians, and facility supervisors.

In the exemplary embodiment, industrial facility 205 includes one or more monitoring sensors 240. Monitoring sensors 240 collect operational measurements including, without limitation, voltages, vibration readings, temperatures, pressures, and flows throughout industrial facility 205. Monitoring sensors 240 repeatedly (e.g., periodically, continuously, and/or upon request) transmit operational measurement readings at the time of measurement. CPU 215 receives and processes the operational measurement readings. Also, CPU 215 includes, without limitation, sufficient data, algorithms, and commands to facilitate operation and monitoring of industrial facility 205. Such data is transmitted across network 225 and may be accessed by any device capable of accessing network 225 including, without limitation, desktop computers and laptop computers, either of which may be similar to computing device 105, all of which may also fall under the definition of cyber assets as used herein.

In the exemplary embodiment, monitoring sensors 240 may generate a large volume of data. Therefore, other devices 220 includes at least one data server with a database and storage system that enables operation of industrial facility 205 and industrial control system 200 as described herein.

Figure 3:
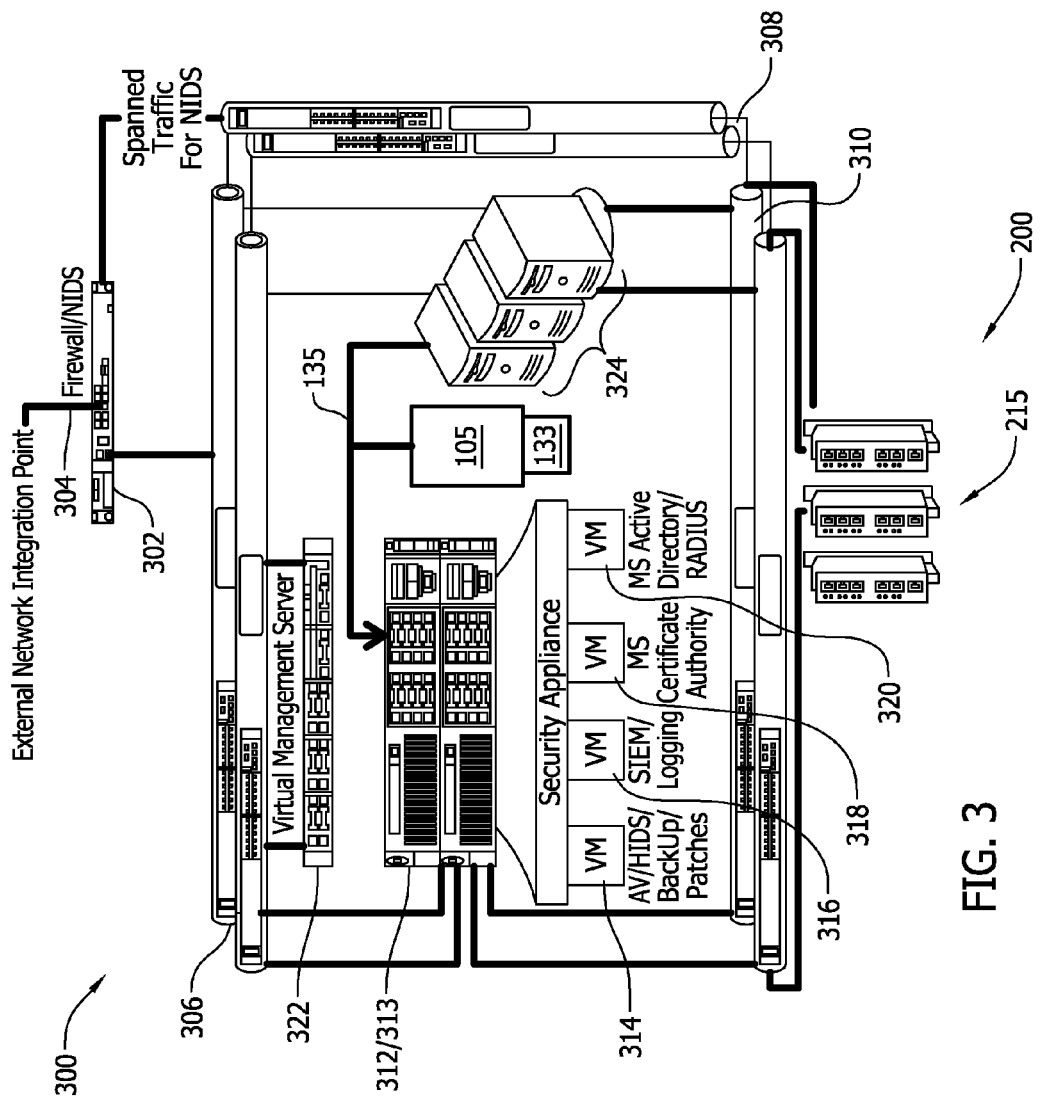
FIG. 3 is a schematic diagram of an exemplary offline patch change management system that may be used with the industrial control system shown in FIG. 2.

FIG. 3 is a schematic diagram of an exemplary patch change management system 300 that may be used with industrial control system 200. Patch change management system 300 executes a significant portion of its operation offline, that is, without direct interaction with industrial control system 200 when system 200 is in operational service, in order to decrease a potential for any negative impact on operation of industrial facility 205 (shown in FIG. 2). In the exemplary embodiment, system 300 includes a network intrusion detection system (NIDS) and firewall device 302 that monitors and facilitates protection of industrial control system 200 by providing detection of known or suspicious network activity. NIDS/Firewall device 302 is coupled to an external network through an integration point 304. Also, in the exemplary embodiment, system 300 includes a plurality of interconnected multiplexers 306 and network switches 308 and 310.

Patch change management system 300 is coupled to computing device 105 with reader device 133 through communications interface 135. Specifically, in the exemplary embodiment, system 300 includes a security appliance 312 coupled to computing device 105 and reader device 133. As used herein, security appliance 312 is any server appliance that is designed to protect computer networks from unwanted traffic. Security appliance 312 uses virtualization, i.e., virtual machine (VM) technology to facilitate operation thereof. As used herein, a VM is a simulation of a machine (abstract or real) that is usually different from the target machine (where it is being simulated on). VMs may be based on specifications of a hypothetical computer or emulate the architecture and functioning of a real world computer.

Security appliance 312 includes a first virtual machine (VM) module 314. First VM module 314 includes sufficient programming to facilitate operation of antivirus (AV) features, a host-based intrusion detection system (HIDS), patch deployment, and backup activities. In the exemplary embodiment, security appliance 312 includes a reader device 313. First VM module 314 acts as a server to centrally deploy cyber asset protection (CAP) software updates, e.g., patch change updates from removable media, e.g., DVDs or CDs inserted into reader device 313 of security appliance 312 and/or reader device 133, and perform rule based backup procedures. First VM module 314 also supports consistent and correct deployment of operator acknowledged updates and backups to support traceability and audit reporting.

Security appliance 312 also includes a second VM module 316 for security and incident event management (SIEM) configured to facilitate real-time display of activity within industrial control system 200 to support correlation analysis thereof. Second VM module 316 acts as a SIEM server and facilitates collecting logs from network switches 308 and 310, controllers 215, human machine interfaces (HMIs) 324, security appliance 312, and NIDS/Firewall device 302. Second VM module 316 provides a single, centralized, and real-time display of activity throughout industrial control system 200 to support correlation analysis.

Security appliance 312 further includes a third VM module 318 for certificate authority configured to facilitate access control to industrial control system 200. Third VM module 318 acts as a certificate authority server and maintains session authenticity between controllers 215 and an authenticated user on domain controlled HMIs 324, thereby enabling industrial control system 200 to operate in secure mode during normal operations. When operating in secure mode, controllers 215 solely permit executable files on a hash protected, encrypted list defined in firmware. As used herein, the terms hash protected, hash encoded, and hash codes refers to generating a hash encoded string from any input text string. Hash codes are commonly used as a reference value when validating messages following transmission. The original string cannot be reconstructed from the hash string. This process is sometimes referred to as one-way encoding. The one-way hash code is generated from a message prior to transmission and provided to the receiver. Following transmission, the receiver generates a one-way hash from the message using the same method applied by the sender. If the values match, the message bytes are considered to be intact and in the correct order.

Security appliance 312 also includes a fourth VM module 310 that acts as an active directory/remote authentication dial-in user service (RADIUS) server configured to facilitate centralized management of security policies for industrial control system 200 allowing unique identification, authentication and administration of users. Active directory may also be used to execute account policies related to aging and record retention. Also, the RADIUS server features integrate with the active directory features to extend centralized account management to network switches 308 and 310 and NIDS/firewall 302.

Further, in the exemplary embodiment, offline patch change management system 300 includes a virtual management server 322 that facilitates managing the IP addresses and the hardware level aspects of the virtual host configuration files. As used herein, the term cyber assets also refers to devices that include, without limitation, NIDS/Firewall device 302, multiplexers 306, network switches 308 and 310, security appliance 312, virtual management server 322, and HMIs 324.

Moreover, in the exemplary embodiment, HMIs 324 may be a portion of patch change management system 300. HMIs 324 may include reader devices similar to reader devices 133 and 313 that may be used to read the patch update information stored on computer-readable storage media inserted therein. Also, HMIs 324 may be coupled to security appliance 312 through communications interface 135.

Figure 4:
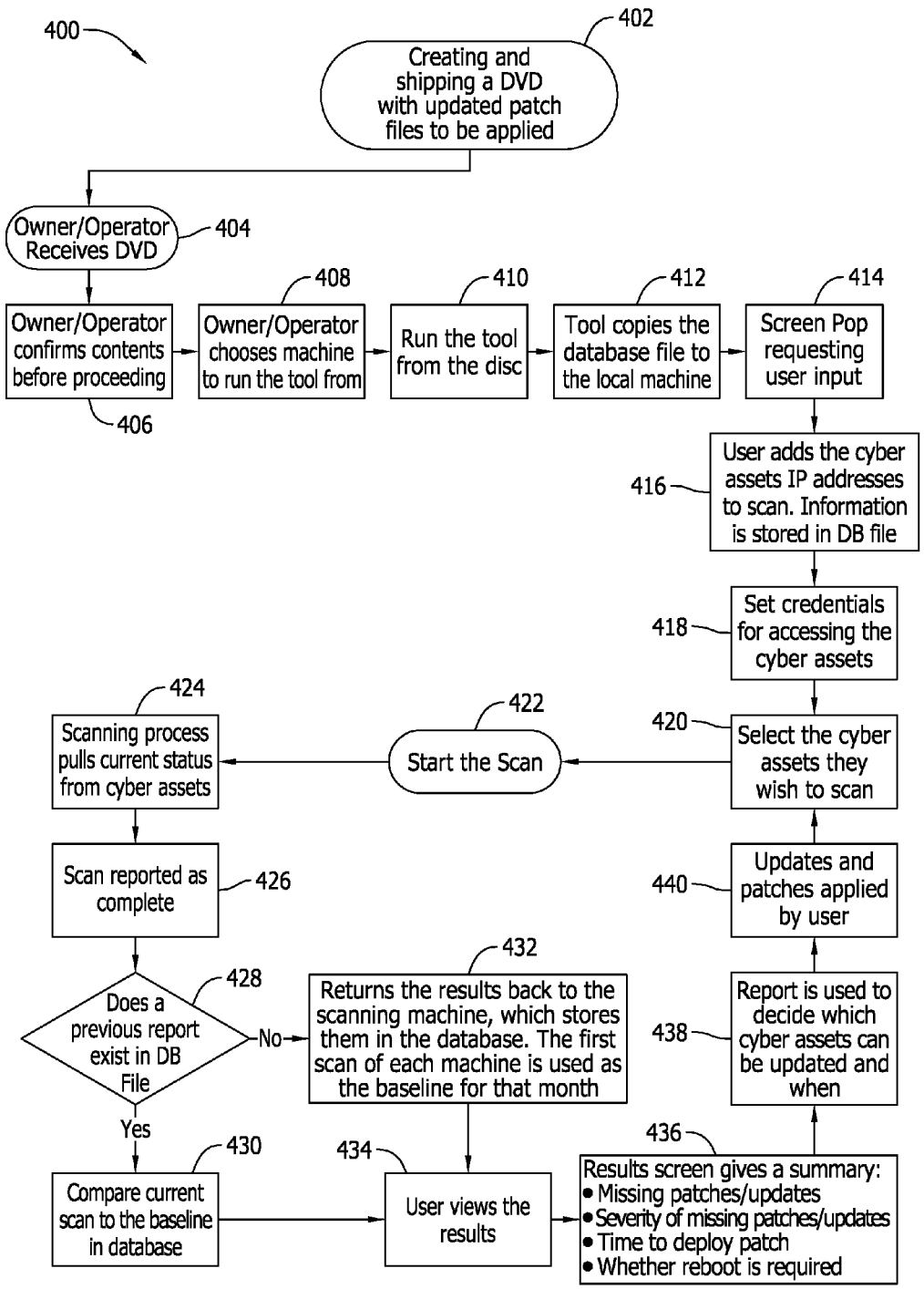
FIG. 4 is a flow chart of an exemplary method of patch change management of cyber assets using the patch change management system shown in FIG. 3.

FIG. 4 is a flow chart of an exemplary method 400 of patch change management of cyber assets using patch change management system 300 (shown in FIG. 3). More specifically, method 400 defines a method of generating a report of available patches for deployment on industrial control system 200 (shown in FIG. 2). A hashed computer-readable storage media, e.g., without limitation, a DVD or a CD, with updated patch database files to be applied is created and shipped 402 to an owner/operator of industrial control system 200. Such updates may be created and shipped with any periodicity that enables operation of patch change management system 300 as described herein, including, without limitation, monthly. Each update is scripted and shipped to industrial facility 205 (shown in FIG. 2) as a single database file with updated XML files that identify the predetermined patches to be applied. Any updates that are identified to potentially impact operations are excluded and such excluded updates are documented and a mitigation strategy is developed to compensate for this security update.

The DVD/CD with the updates and a read/extraction tool is shipped to the site via a secure, sealed shipping envelope, whereby the chain of custody of the update is also maintained throughout transit until being delivered to the site and received 404 by the owner/operator of industrial control system 200. The owner/operator confirms 406 the hash value upon receipt and/or after electronic confirmation by one of industrial control system 200, offline patch management system 300, and/or another security application, and prior to proceeding with installation. Prior to deployment, any scripted update actions must be acknowledged by the owner/operator prior to being deployed.

The owner/operator chooses 408 which machine to run the read/extraction tool from, i.e., in the exemplary embodiment, reader device 313 in security appliance 312. Alternatively, computing device 105 with reader device 133 (both shown in FIGS. 1 and 3) may be used. Also, alternatively, HMIs 324 with built-in reader devices may be used. The read/extraction tool is run 410 directly from the DVD/CD and no executable files are added to computing device 105 through reader device 133. The read/extraction tool copies 412 the encrypted database file to security appliance 312 (shown in FIG. 3) for deployment through first VM module 314. User input is requested 414 through a pop-up screen on presentation interface 120 (shown in FIG. 1) of computing device 105. The user adds 416 the IP addresses of the cyber assets to scan and the information from the DVD/CD is encrypted and stored in a database file. Such cyber assets include, without limitation, computing device 105, controllers 215, other devices 220, communications network 225, monitoring sensors 240 (all shown in FIG. 2). Such cyber assets also include without limitation, NIDS/Firewall device 302, multiplexers 306, network switches 308 and 310, security appliance 312, virtual management server 322, and HMIs 324 (all shown in FIG. 3).

The credentials for accessing the cyber assets are set 418 and the cyber assets to be scanned are selected 420 and the scan of the cyber assets is started 422.

During scanning, the current status of the cyber assets is pulled 424. Upon completion of the scan, the scan is reported 426 as complete. A determination is made 428 as to whether a previous report exists in the database file. If a previous report does exist, the results of the current scan are compared 430 to an established baseline status in the database. If no previous reports exist, the results of the current scan are returned 432 back to security appliance 312, which stores them in the database. The first scan of each of the cyber assets is used as the baseline for that month. The user views 434 the results as they are generated 436 on presentation interface 120 of computing device 105.

FIG. 5 is an exemplary patch applicability report 500 generated by patch change management system 300 (shown in FIG. 3) using method 400 (shown in FIG. 4). Report 500 includes a "Status" column 502 that includes a status of patches that are not operatively resident within industrial control system 200. A patch is either one of "missing", "installed", or "failed". "Missing" implies that the patch has not been installed for either of reasons that include an intentional decision to not install or unintentionally not installed after an attempt that was not successful due to unforeseen circumstances. "Installed" implies that the patch was successfully installed and will typically be seen once the patches for the month have been installed. "Failed" implies the end user attempted to install the patch, but, due to an error, was unable to successfully deploy the patch. A number will follow the word "Failed" that will reference a reason at the bottom of the report as to why that patch failed.

Report 500 also includes a "Patch Number" column 504. "KBxxxxx" may refer to a knowledge base article number associated with each patch and "Qyyyyy" is the automatic update number. Report 500 further includes a "Bulletin ID" column 506 and a "Bulletin Title" column 508 that provide a security tech center bulletin ID number and title, respectively. Report 500 also includes a "US-CERT Criticality Rating" column 510 that generates the importance of a security patch using the definitions provided by the United States Computer Emergency Readiness Team (US-CERT). Such ratings include "High", "Medium", and "Low" as defined by US-CERT.

Report 500 further includes a "Restart Requirement" column 512 that documents whether this patch will require a system reboot or not prior to full deployment of the patch. Report 500 also includes an "Estimated Patch Install Time" column 514 that displays the average amount of time it took to install this patch during representative lab validation testing of the patch.

Referring again to FIG. 4, report 500 (shown in FIG. 5) is used 438 to decide which of the cyber assets can be updated and when the update would be best deployed with respect to disruptions of operation. Once the ramifications of deployment are reviewed and an operational window is available, the updates and patches are applied 440 by the user. In some embodiments, portions of industrial control system 200 may be backed up through first VM module 314 prior to deploying the updates and patches.

In contrast to known patch change management systems, the computer-based patch change management systems as described herein facilitate scanning equipment, i.e., cyber assets in an industrial control system and generating a scan report including a patch status for the patches not operatively resident on the industrial control system. Specifically, the computer-based patch change management systems as described herein facilitate scanning devices such as firewalls, network intrusion detection systems, security appliances, controllers, multiplexers, network switches, and HMIs for patch updates deployed thereon. The scan report also includes a critically rating of the patches, a deployment temporal period of the patches, and a restart requirement of the patches. Therefore, in contrast to known patch change management systems, the computer-based patch change management systems as described herein facilitate deploying patches to industrial control systems in a manner best suitable for the owner/operators of the cyber assets. Also, in contrast to known patch change management systems, the computer-based patch change management systems as described herein facilitate maintaining a detailed, cumulative listing of patches not yet deployed.

An exemplary technical effect of the methods, systems, and apparatus described herein includes at least one of (a) generating a scan report including a patch status for the patches not operatively resident on an industrial control system; (b) providing a criticality rating of the patches; (c) providing a deployment temporal period of the patches; (d) providing a restart requirement of the patches; (e) facilitate deploying patches to industrial control systems in a manner best suitable for the owner/operators of the cyber assets; and (f) maintaining a detailed, cumulative listing of patches not yet deployed.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

While the invention has been described in terms of various specific embodiments, those skilled in the art will recognize that the invention can be practiced with modification within the spirit and scope of the claims.

What is claimed is:

1. An offline patch change management system, comprising:
    at least one industrial control system configured to monitor an industrial facility, wherein the at least one industrial control system comprises at least one cyber asset;
    at least one reader device configured to read patch update information stored on computer-readable storage media inserted therein;
    a memory device coupled to the at least one reader device, wherein the memory device is configured to store the patch update information; and
    a processor coupled to the memory device, wherein the processor is configured to:
    scan the at least one cyber asset;
    generate a scan report including a patch status for at least one patch not operatively resident on the at least one cyber asset, wherein the scan report comprises an estimated install time associated with the at least one patch; and
    generate a cumulative scan report comprising one or more patches not yet deployed to the at least one industrial control system.

2. The offline patch change management system of claim 1, wherein the scan report comprises a criticality rating associated with the at least one patch.

3. The offline patch change management system of claim 1, wherein the scan report comprises a restart requirement associated with the at least one patch.

4. The offline patch change management system of claim 1, wherein the processor is configured to facilitate a backup of at least a portion of the at least one industrial control system.

5. The offline patch change management system of claim 1, wherein the processor is configured to determine a presence of one or more previous scan reports.

6. The offline patch change management system of claim 1, wherein the processor is configured to read updated patch database files that are hash encrypted.

7. The offline patch change management system of claim 1, wherein the industrial facility comprises a chemical plant, a petroleum plant, an electric power generation plant, a gasification plant, an integrated gasification combined cycle plant, an electric power transmission and distribution system, a natural gas transmission system, or any combination thereof.

8. An offline method for patch change management of cyber assets, comprising:
    reading patch update information stored on computer-readable storage media using at least one reader device configured to couple to at least one industrial control system, wherein the at least one industrial control system is configured to monitor an industrial facility;
    scanning at least portions of the industrial control system that includes at least one cyber asset;
    generating a scan report including a patch status for at least one patch not operatively resident on the at least one cyber asset, wherein the scan report comprises an estimated install time associated with the at least one patch; and
    generating one or more cumulative reports comprising one or more patches not yet deployed to the at least one industrial control system.

9. The method of claim 8, wherein the scan report further including comprises a restart requirement of the at least one patch.

10. The method of claim 8, wherein reading the patch update information stored on computer-readable storage media using the at least one reader device comprises inserting a hash encrypted computer-readable storage media with XML files that identify one or more predetermined patches within the patch update information.

11. The method of claim 8, wherein reading patch update information stored on computer-readable storage media using the at least one reader device comprises running a software update scan tool directly from the computer-readable storage media through the at least one reader device.

12. The method of claim 11, further comprising receiving one or more inputs via a user interface, wherein the inputs correspond to the portions of the industrial control system to be scanned.

13. The method in of claim 11, further comprising generating a software update baseline in a database.

14. An industrial facility comprising:
  at least one industrial control system comprising at least one cyber asset, wherein the at least one industrial control system is configured to monitor the industrial facility; and
  an offline patch change management system comprising:
  at least one reader device configured to read patch update information stored on computer-readable storage media inserted therein;
  a memory device coupled to the at least one reader device, wherein the memory device is configured to store the patch update information; and
  a processor coupled to the memory device, wherein the processor is configured to:
  scan the at least one cyber asset;
  generate a scan report including a patch status for at least one patch not operatively resident on the at least one cyber asset, wherein the scan report comprises an estimated install time associated with the at least one patch; and
  generate a cumulative scan report comprising one or more patches not yet deployed to the at least one industrial control system.

15. The industrial facility of claim 14, wherein the scan report comprises a criticality rating associated with the at least one patch and a restart requirement associated with the at least one patch.

16. The industrial facility of claim 14, wherein the processor is configured to facilitate backups of at least a portion of the at least one industrial control system.

17. The industrial facility of claim 14, wherein the processor is configured to: determine a presence of one or more previous scan reports.

18. The industrial facility of claim 14, wherein the processor is configured to read updated patch database files that are hash encrypted.

* * * * *

UNITED STATES PATENT AND TRADEMARK OFFICE
CERTIFICATE OF CORRECTION

| | | |
|---|---|---|
| PATENT NO. | : 8,869,133 B2 | Page 1 of 1 |
| APPLICATION NO. | : 13/669770 | |
| DATED | : October 21, 2014 | |
| INVENTOR(S) | : Alls et al. | |

It is certified that error appears in the above-identified patent and that said Letters Patent is hereby corrected as shown below:

On the Title Page, item (71), under "Applicant", in Column 1, Line 1, delete "Corporation," and insert -- Company, --, therefor.

In the claims

In Column 10, Lines 65-66, in Claim 9, delete "report further including" and insert -- report --, therefor.

In Column 11, Line 17, in Claim 13, delete "in of" and insert -- of --, therefor.

Signed and Sealed this
Tenth Day of November, 2015

Michelle K. Lee
*Director of the United States Patent and Trademark Office*